United States Patent
Bernhardt et al.

(10) Patent No.: US 7,469,034 B2
(45) Date of Patent: Dec. 23, 2008

(54) METHOD FOR ANALYZING AND REPRESENTING X-RAY PROJECTION IMAGES AND X-RAY EXAMINATION UNIT

(75) Inventors: Philipp Bernhardt, Forchheim (DE); Friedrich Koch, Pommersfelden (DE); Martin Kolarjk, Nürnberg (DE); Ernst Peter Rührnschopf, Erlangen (DE); Helmuth Schramm, Neunkirchen (DE)

(73) Assignee: Siemens Aktiengesellschaft, Munich (DE)

( * ) Notice: Subject to any disclaimer, the term of this patent is extended or adjusted under 35 U.S.C. 154(b) by 83 days.

(21) Appl. No.: 11/409,419

(22) Filed: Apr. 21, 2006

(65) Prior Publication Data
US 2006/0245538 A1    Nov. 2, 2006

(30) Foreign Application Priority Data
Apr. 27, 2005    (DE)    .................. 10 2005 019 572

(51) Int. Cl.
G01N 23/04    (2006.01)
G01T 1/36    (2006.01)
G01T 1/161    (2006.01)

(52) U.S. Cl. ...................... 378/62; 378/48; 382/132; 250/363.09

(58) Field of Classification Search ........... 378/4–20, 378/51, 62, 65, 207, 901, 41, 42, 44–56, 378/91, 156–159, 204, 210; 382/132, 190, 382/192, 195, 274; 250/362, 363.01, 363.07, 250/363.09, 370.01, 370.06–370.09, 371
See application file for complete search history.

(56) References Cited

U.S. PATENT DOCUMENTS

| | | | | |
|---|---|---|---|---|
| 4,105,922 A | * | 8/1978 | Lambert et al. | 382/131 |
| 4,233,507 A | * | 11/1980 | Volz | 378/18 |
| 4,788,706 A | * | 11/1988 | Jacobson | 378/207 |
| 5,307,264 A | * | 4/1994 | Waggener et al. | 378/14 |
| 5,412,703 A | * | 5/1995 | Goodenough et al. | 378/8 |
| 5,844,964 A | * | 12/1998 | Aichinger et al. | 378/207 |
| 6,201,850 B1 | * | 3/2001 | Heumann | 378/56 |
| 6,570,955 B1 | * | 5/2003 | Siffert et al. | 378/54 |
| 6,754,307 B2 | | 6/2004 | Brendler et al. | |
| 6,990,222 B2 | * | 1/2006 | Arnold | 382/131 |
| 7,086,780 B2 | * | 8/2006 | Wu et al. | 378/207 |
| 7,236,559 B2 | * | 6/2007 | Jha et al. | 378/5 |
| 2001/0004394 A1 | * | 6/2001 | Siffert et al. | 378/56 |
| 2004/0228443 A1 | * | 11/2004 | Bohm et al. | 378/97 |
| 2004/0228453 A1 | * | 11/2004 | Dobbs et al. | 378/210 |
| 2005/0058259 A1 | * | 3/2005 | Vija et al. | 378/210 |
| 2006/0067461 A1 | * | 3/2006 | Yin et al. | 378/5 |
| 2006/0109949 A1 | * | 5/2006 | Tkaczyk et al. | 378/4 |
| 2006/0159223 A1 | * | 7/2006 | Wu et al. | 378/18 |

FOREIGN PATENT DOCUMENTS

EP    1 257 155 A2    11/2002

* cited by examiner

*Primary Examiner*—Edward J Glick
*Assistant Examiner*—Anastasia Midkiff

(57) ABSTRACT

The invention relates to a method and an x-ray examination unit for analyzing and representing x-ray projection images with an x-ray examination unit, where the function relation $b_U = f_U^{-1}(J^-/J_0)$ is established between the attenuation value and a material-equivalent value as a function of the energy spectrum used, and for the purposes of projection representation, the magnitude of the material-equivalent value $b_U$ of a specific material is represented as an image value.

14 Claims, 2 Drawing Sheets

METHOD FOR ANALYZING AND REPRESENTING X-RAY PROJECTION IMAGES AND X-RAY EXAMINATION UNIT

CROSS REFERENCE TO RELATED APPLICATIONS

This application claims priority to the German Application No. 10 2005 019 572.5, filed Apr. 27, 2005 which is incorporated by reference herein in its entirety.

FIELD OF INVENTION

The invention relates to a method for analyzing and representing x-ray projection images with an x-ray examination unit, where an object, preferably a patient, is radiographed from a radiation source and its focus, the radiation penetrating the object is measured on the side lying opposite the focus with the aid of a detector field consisting of a large number of individual detector elements, the attenuation values are determined from the local radiation intensities measured on the detector field and the initial radiation intensity, and a projection representation of the radiographed object is established with the aid of the measured attenuation values.

Furthermore, the invention also relates to an x-ray examination unit for creating two-dimensional projection images of a transilluminated object, with a radiation source which radiographs an object, preferably a patient, from a focus, a detector field consisting of a large number of individual detector elements which detects the rays penetrating the object on the side lying opposite the focus, and a processing unit which determines the attenuation values in line with the local radiation intensities measured on the detector field and the initial radiation intensity, and establishes a projection representation of the radiographed object with the aid of the measured attenuation values.

BACKGROUND OF INVENTION

A similar method and a similar x-ray examination unit are generally known, where the attenuation values established are displayed directly as gray values in a projection representation in connection with the known method and the known x-ray examination unit. X-ray units and x-ray methods of this type are mostly used for the purposes of medical imaging where the radiation parameters, such as the tube voltage, tube current and exposure time, and where relevant also a prefiltering stage, are adapted to the current imaging problem. In this respect, the energy spectrum used for the x-ray radiation has a strong effect on the projection depiction generated since different absorption coefficients occur for the same radiographed material as a function of the energy spectrum of the x-ray radiation utilized. Thus, for example, the representation of vessels dyed with contrast medium requires a lower tube voltage than that of soft tissue differences. While low tube voltages can be used in the case of thin patients, the tube voltage has to be increased in the case of thick patients in order to increase the radiation transparency on the one hand and utilize the higher efficiency of the x-ray tube at higher voltages on the other. However, this forced increase in voltage has an adverse effect on the contrast in the image due to the increased transparency and the growing scattered radiation component. These losses in contrast are currently either accepted or an attempt is made to compensate for this drawback with the aid of tightly configured gray value windowing. Great experience is nevertheless necessary for the purposes of assessing such projection x-ray photographs in order to be able to compensate for the differences in the creation of the x-ray photographs in the right way for a correct finding.

SUMMARY OF INVENTION

An object of the invention is to find a method and an x-ray examination unit which delivers identical projection representations of an identical object independently of the x-ray radiation actually used and its energy spectrum.

This object is achieved by the features of the independent claims. Advantageous developments of the invention form the subject of subordinate claims.

The inventors recognized the following:

It is possible in the case of transillumination to calculate, from the absorbed intensities, and for every gray value of an image, a resultant water equivalence value which [lacuna] either a local water-equivalent mass occupation, for example to calculate a patient thickness in the case of constant density or a tissue density in the case of constant thickness. Naturally, any other homogeneous material can also be taken in place of water, but the following description will refer in the first instance to water and the established thickness. The water equivalence value then comprises the mass of the water column per unit of surface area that is needed to obtain precisely the same intensity as the measured intensity in a pixel. This image matrix of the water equivalence values can be displayed directly or serve as the starting point for optional further image processing. In the case of a gray value representation of the water equivalence values, it is recommended that the gray values are inverted where relevant in order to get back to the image impression familiar in cardiography for example, since otherwise strongly absorbing regions are occupied with large values while weakly absorbing regions are characterized by low numbers. This method is similar to an intrinsically known method of spectrum-dependent representation LUT (LUT=Look Up Table) but has the advantage that the numerical values of the image can be interpreted physically/anatomically as the local equivalent patient thickness.

The radiation of the x-ray tubes is polychromatic; the energy spectrum of the photons emitted at the anode as bremsstrahlung is also dependent on the applied high voltage U with which the electrons are accelerated from the cathode to the anode; the maximum photon energy then comprises $E_{max}(U)=U(keV/kV)=eU$, where the kiloelectronvolt [keV] is customarily used as the energy unit. It is not only the emission spectrum of an x-ray tube that is critical for imaging, however, but also the transparency of the spectral filters used $W(E)=\exp(-\mu_F(E)T_F)$, with the filter thickness $T_F$, the energy-dependent attenuation coefficient $\mu_F(E)$) and the spectral responsiveness of the detector $\eta_D(E)$. Voltage-dependent standardized spectral distributions are defined by $$S_U(E)=Q_U(E)W(E)\eta_D(E)/c_U \quad (\#1)$$

with the standardization factor $$c_U = \int_0^{eU} Q_U(E)W(E)\eta_D(E)dE, \Rightarrow \int_0^{eU} S_U(E)dE = 1.$$

It is assumed in the following that the attenuation of an x-ray photon beam in the object (patient) is caused solely by water-equivalent material. In this respect, "water-equivalent" means that the energy-dependence of the mass attenuation coefficient $(\mu/\rho)(E)$ is identical to water and differences are based only on local differences in the density $\rho$.

Let a measuring ray be considered which penetrates the object and results in a measured attenuation value at a detector pixel. The coordinate along its path is designated by x and the local (linear) energy-dependent attenuation coefficient is $\mu(x,E)=\rho(x)\alpha(x,E)$, where the mass attenuation coefficient is abbreviated to $\alpha$ and $$\alpha(x,E)=\mu(x,E)/\rho(x)$$

applies. With regard to the standardized attenuation value relating to the measuring ray under consideration, the following then applies $$J^\sim/J_0 = \int_0^{eU} \exp\left(-\int \mu(x,E)dx\right)S_U dE \quad (\#2)$$
$$= \int_0^{eU} \exp\left(-\int \rho(x)\alpha(x,E)dx\right)S_U dE,$$

where the measuring ray was recorded at a tube voltage U.

In this respect, $J_0$ comprises the unattenuated measured value without material in the path of the rays, which must be known. With regard to equation (#2), a water equivalence value with reference to the material occupation $b_U=b_U(J^\sim)$ can now be determined in the following manner: if $\alpha_W(E)$ is the energy-dependent mass attenuation coefficient of water, then with regard to a measuring ray, the standardized attenuation value with the voltage-dependent spectral distribution $S_U(E)$, which is attenuated in water along a mass occupation (path length x density) b, can be determined as $$f_U(b) = \int_0^{eU} \exp(-b\alpha_W(E))S_U dE. \quad (\#3)$$

This function can be calculated in advance for every voltage U or even determined experimentally.

With regard to each attenuation value $J^\sim$ according to Equation (#2), a water equivalence value $b_U=b_U(J^\sim/J_0)=b$ can be determined in such a way that $J^\sim/J_0=f_U(b)$ applies as defined by Equation (#3), specifically by inversion of Equation (#3):

$$b_U=f_U^{-1}(J^\sim/J_0) \quad (\#4)$$

An improvement in the determination of the water equivalence value can be achieved in that, in Equation (#4), the measured intensity $J^\sim$ is additionally corrected with reference to the component of scattered radiation.

A simple variant can consist in determining the average patient thickness in approximate terms in the first instance, which can be converted into a mass occupation with the aid of the density of water. An average scattered radiation component can be read out from a table established in advance, with the aid of which the image matrix of the intensities can be corrected, for example by means of a correction factor or by subtracting a scattered ray component. However, this method can also be improved in concrete terms by means of more accurate methods, which are in themselves known, for estimating the scattered radiation distribution, such as a convolution model, iteration methods, etc., for example.

Similarly, any material can be used in place of water which is preferably representative of the material of the radiographed object. If the object is a patient, then water, Plexiglas or a similar tissue-like material can preferably be used.

In line with the realizations outlined above, the inventors propose to improve the method for analyzing and representing x-ray projection images with an x-ray examination unit where, in the known method, an object, preferably a patient, is radiographed from a radiation source and its focus, the radiation penetrating the object is measured on the side lying opposite the focus with the aid of a detector field consisting of a large number of individual detector elements, the attenuation values ($J^\sim/J_0$) are determined from the local radiation intensities ($J^\sim$) measured on the detector field and the initial radiation intensity ($J_0$), whereby a projection representation of the radiographed object is established with the aid of the measured attenuation values. The improvement according to the invention consists in the fact that the function relation ($b_U=f_U^{-1}(J^\sim/J_0)$) is established between the attenuation value and the material-equivalent value (=mass occupation) as a function of the energy spectrum used, and for the purposes of projection representation, the magnitude of the material-equivalent value ($b_U$) of a specific material is represented as an image value.

This manner of representation assigns to the imaging a direct, anatomically interpretable magnitude which can be interpreted considerably better when compared to the former manner of representation in a gray scale which just shows the absorption effect as a function of the radiation used in each case. Thus, the recording of specific regions for example, the regions represented by means of contrast medium for example, can also be carried out considerably more easily since absolute values, independent of the imaging radiation used, can now be utilized. Direct radiation and strongly absorbent implants or radiation protection shields can also be identified more easily in the image with the aid of such a water equivalence value image matrix. Methods which look for specific tissue types in the image, such as the lung area or the spinal column, can also be supported with the information from the local water equivalence value.

According to the invention, water, for example, or some other tissue-like material, such as Plexiglas for example, can be used as the material for determining the relation between the absorption and the magnitude of the material-equivalent value.

The thickness of a material of homogenous density or the density of a material of homogenous thickness, for example, can be used as the material-equivalent value.

In the representation, the image value can be reproduced as a gray value or even, for example, as a color value, where a considerably greater bandwidth becomes more clearly distinguishable in optical terms in the latter case.

The image value is preferably displayed in inverted form, especially in the case of gray value representation, since the image impression generated essentially corresponds to an x-ray photograph in this case.

The inventors propose furthermore that the function relation between the radiation absorption and a material-equivalent value is determined by means of empirical measurement and where relevant the established measured values set down in an approximation formula or lookup table. In the case of a lookup table, it may be additionally necessary to determine intermediate values by means of an interpolation method. In the case of this manner of determining the function relation between the radiation absorption and a material-equivalent value, precise knowledge of the energy spectrum actually used for the x-ray radiation is not necessary, but unambiguous assignment between the energy spectrum used and an empirical measurement carried out with that spectrum must be possible.

Another variant consists in the approach that the function relation between the radiation absorption and a material-equivalent value is calculated according to the formula $$f_U(b) = \int_0^{eU} \exp(-b\alpha_W(E))S_U\,dE$$

This requires, however, that knowledge of the energy spectrum used for the x-ray radiation is present so that a corresponding calculation of the energy-dependent absorption, as represented in the formula shown above, is possible.

A further improvement of the method can provide that a scattered ray correction takes place prior to the actual conversion from the radiation absorption values to a material-equivalent value so that the effect of the constantly present scattered radiation is avoided.

In line with the basic idea according to the invention outlined in the form of a method according to the invention above, the inventors also propose the improvement of an x-ray examination unit for creating two-dimensional projection images of a transilluminated object where the x-ray examination unit is equipped with:

a radiation source which radiographs an object, preferably a patient, from a focus, a detector field consisting of a large number of individual detector elements which detects the rays penetrating the object on the side lying opposite the focus, a processing unit which determines the attenuation values ($J^-/J_0$) in line with the local radiation intensities ($J^-$) measured on the detector field and the initial radiation intensity ($J_0$), and establishes a projection representation of the radiographed object with the aid of the measured attenuation values.

According to the invention, the improvement lies in the aspect that the processing unit displays a computer program or a circuit or an ASIC which establishes the function relation ($b_U=f_U^{-1}(J^-/J_0)$) between an attenuation value and a material-equivalent value as a function of the energy spectrum used, and contains an output unit on which the magnitude of the material-equivalent value ($b_U$) of a specific material is represented in a projection representation.

The inventors accordingly also propose that means, preferably computer programs or circuits or at least one ASIC, are provided which are configured in such a way that the method stages described above are carried out by the corresponding means during operation.

BRIEF DESCRIPTION OF THE DRAWINGS

In the following, the invention is described in detail on the basis of a preferred exemplary embodiment with the aid of the figures, where only the features necessary for the purposes of understanding the invention are represented. In this respect, the following reference symbols are used: 1: x-ray examination system; 2: x-ray tube; 3: Focus; 4: Flatbed detector; 5: Patient; 6: Ray facets; 7: Current/voltage supply for the x-ray tube; 8: Control and processing unit; 9: Display; 10: Function relation between the attenuation value and the water equivalence value of 70-kVp bremsstrahlung; 11: Function relation between the attenuation value and the water equivalence value of 120-kVp bremsstrahlung; 12 and 13: Different absorption regions; 15: Guide wires; $Prg_1$-$Prg_n$: Programs.

In detail, the figures show the following

DETAILED DESCRIPTION OF INVENTION

Figure 1:
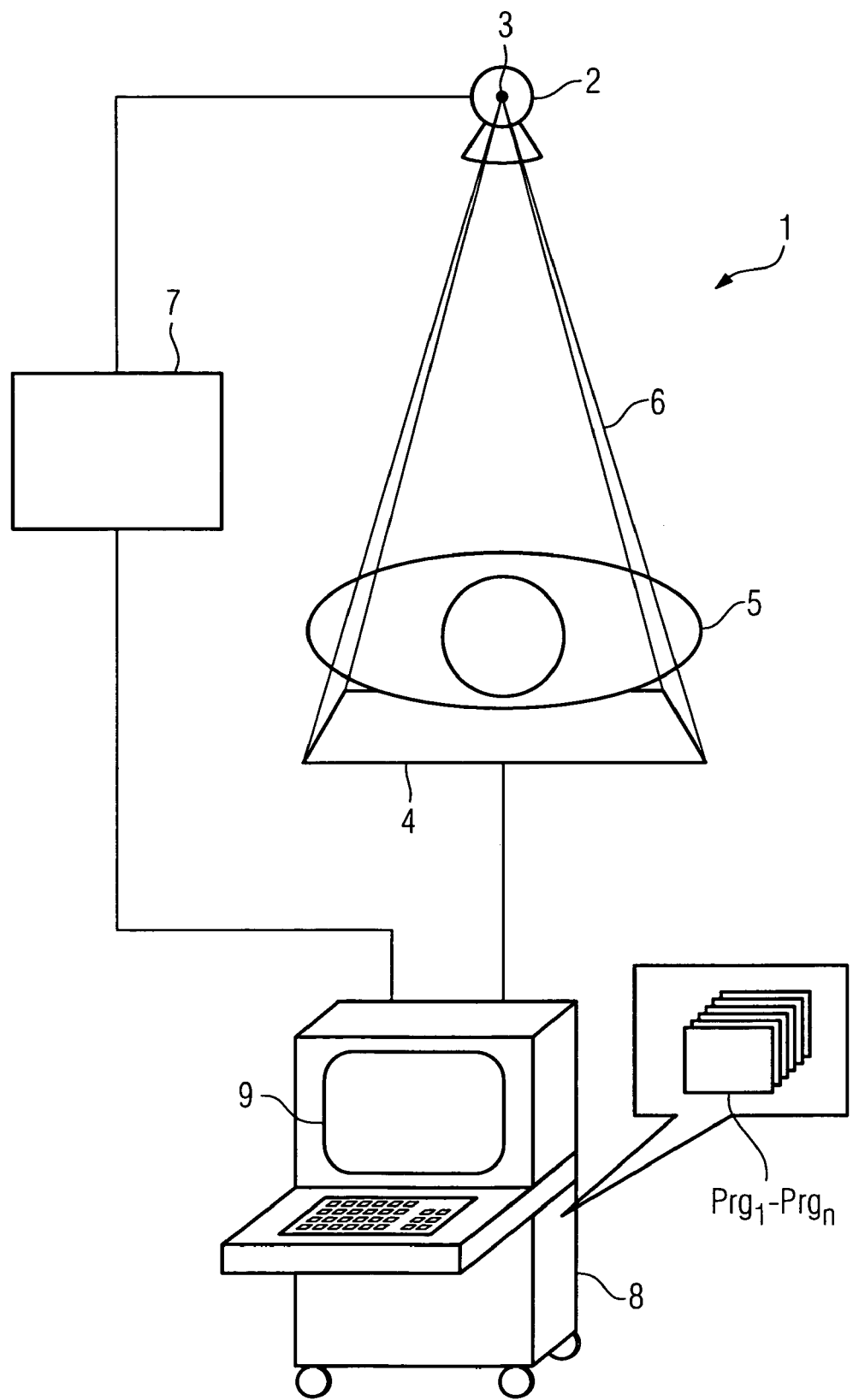
FIG. 1 Schematic representation of an x-ray device according to the invention with a control and processing unit.

FIG. 1 shows a schematic representation of an x-ray examination unit 1 according to the invention consisting of an x-ray tube 2 with a focus 3, emanating from which a beam of rays 6 lands on a digital detector 4 lying below it, where a patient 5 is situated in the path of its rays. The x-ray tube 2 is operated via a power unit 7 which is operated from the control and processing unit 8 in line with the requirements for operating personnel in the case of x-ray examination.

When an x-ray photograph is carried out, a detector 4 standardized previously without a patient detects the x-ray radiation passing through the patient and determines, with electronic detector elements not represented in detail here, the local x-ray radiation falling on the detector and therefore the attenuation that it has undergone during the passage through the patient. The detector output data from the individual detector elements distributed over the surface of the detector 4 and not represented here is forwarded to the control and processing unit 8, where the position-dependent attenuation values are determined.

According to the invention, a material equivalence value is subsequently calculated in the control and processing unit 8, with the aid of the programs stored in same, as a function of the energy spectrum used in each case and a projection representation generated on the display 9 for example, in which the magnitude of the position-dependent material equivalence value on the detector for a specific material is represented as an image value.

Water, Plexiglas or a similar preferably tissue-like material can preferably be used as the material.

The mass occupation can be used in general as the material equivalence value. However, in the case of a known density or thickness respectively, the resultant thickness or average density can also be specified.

Figure 2:
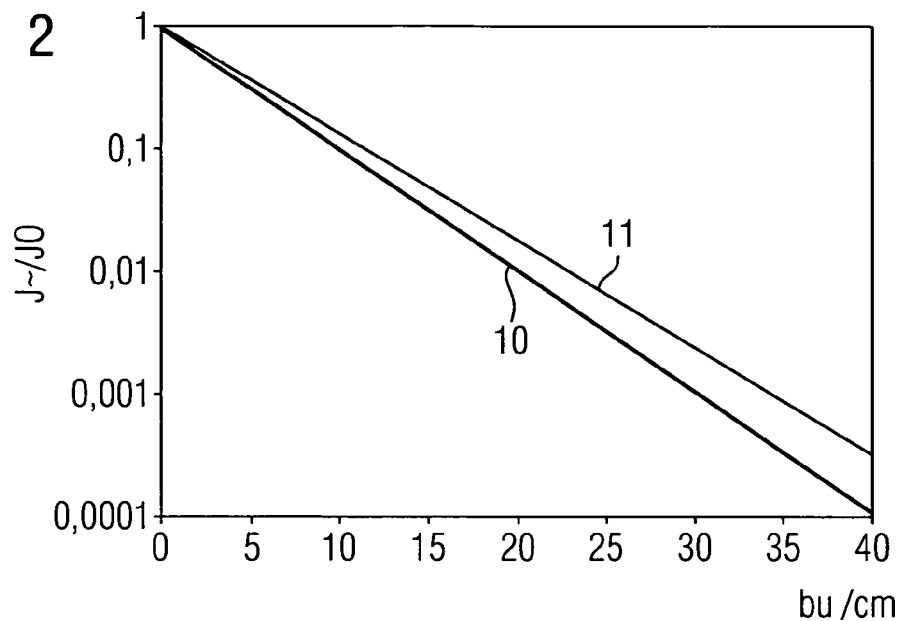
FIG. 2 Functional dependence between the attenuation value and the water equivalence value in cm for 70-kVp and 120-kVp x-ray radiation.

FIG. 2 shows by way of example the function relation between the attenuation value ($J^-/J_0$) and a water equivalence value in cm for different energy spectra of x-ray bremsstrahlung. In this respect, the line 10 corresponds to x-ray radiation with a 70-kVp acceleration voltage, while the line 11 of the function relation between the attenuation value and the water equivalence value corresponds to 120-kVp x-ray radiation. It must be recognized here that on the one hand the relation between the attenuation value and the water equivalence value does not display a precisely linear trend and also considerable differences exist between the x-ray spectra utilized in each case.

Figure 3:
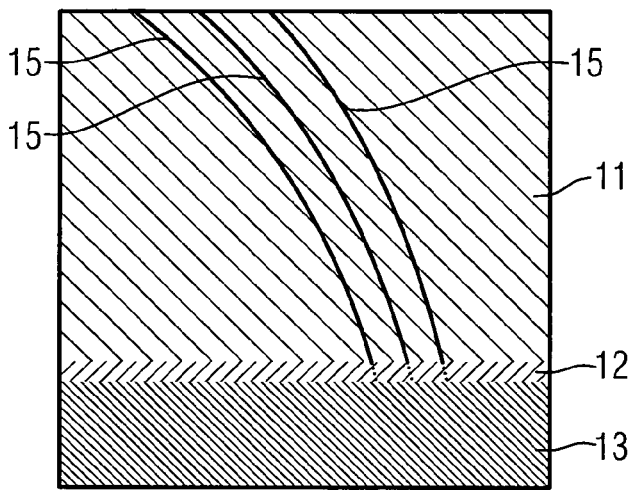
FIG. 3 Photograph at 70 kV, 0.2 mm Cu, linear LUT.
Figure 4:
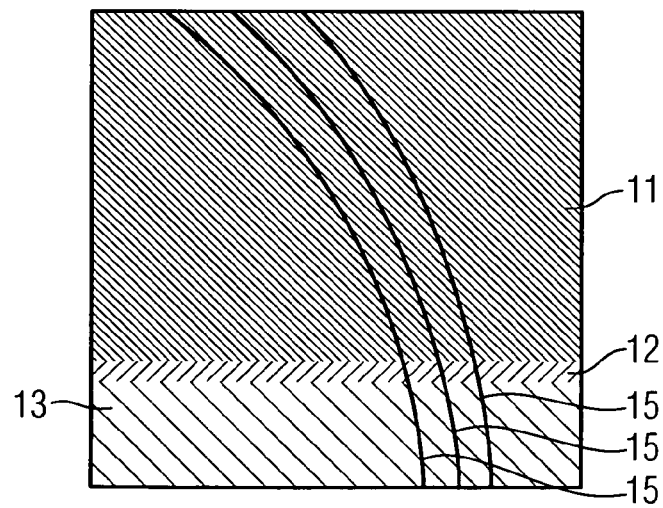
FIG. 4 Photograph from FIG. 3, but with the calculation of the actual water equivalence values.

FIG. 3 shows a known x-ray photograph by means of radiation with a 70-kV acceleration voltage, 0.2 mm Cu filter, using a linear LUT. The image shows two differently absorbing regions 12 and 13, where the depicted guide wires 15 are hardly recognizable any longer in the strongly absorbing region 13 and practically disappear. This photograph is shown again in FIG. 4 with the same radiation conditions but with the method according to the invention. It corresponds to FIG. 3, therefore, but after the calculation of the actual water equivalence values. The guide wires 15 now stand out clearly over the different absorption regions. Apart from this, the absolute actual water equivalence values can now be specified precisely. Between the dark region 12 and the light region 13, there is a defined difference of approx. 4.5 cm.

Overall, therefore, a method and an x-ray examination unit for analyzing and representing x-ray projection images is disclosed with the invention, where the function relation ( ) is established between the attenuation value and a material-equivalent value as a function of the energy spectrum used, and for the purposes of projection representation, the magnitude of the material-equivalent value ($b_U$) of a specific material is represented as an image value. This means that it is now possible to generate comparable images independently of the energy spectrum of the radiation used.

Naturally, the aforesaid features of the invention can be used not only in the combination specified in each case but also in other combinations or on their own, without departing from the framework of the invention.

The invention claimed is:

1. A method of analyzing and displaying x-ray projection images using an x-ray examination unit, comprising the steps of:
   radiographing an object using x-rays originating from a radiation source and a focus of the radiation source;
   measuring the x-rays penetrating the object by a detector field having a plurality of detector elements, the detector field arranged opposite the focus and after the object relative to an x-radiation direction;
   determining x-ray attenuation values from local x-ray intensity values captured by the detector field and from initial x-ray intensity values, the initial x-ray intensity values related to the x-rays before penetrating the object;
   generating and displaying a projection image of the object based upon the determined x-ray attenuation values; and
   determining a functional relationship between the x-ray attenuation values and a material-equivalent coefficient variable relative to an energy spectrum of the x-rays, wherein the material-equivalent coefficient variable is assigned a value characteristic for one specific material and displayed as an image value when displaying the projection image,
   wherein the functional relationship is determined according to the formula $$f_U(b) = \int_0^{eU} \exp(-b\alpha_W(E)) S_U \, dE$$

wherein:
   $S_U$ = an energy-dependent standardized attenuation value,
   b = a path length of the x-radiation,
   $\alpha_W(E)$ = an energy-dependent mass attenuation coefficient.

2. The method according to claim 1, wherein the object is a patient.

3. The method according to claim 1, wherein the material-equivalent coefficient variable represents water and is assigned with the value characteristic for water.

4. The method according to claim 1, wherein the material-equivalent coefficient variable represents tissue and is assigned with the value characteristic for tissue.

5. The Method according to claim 1, wherein the material-equivalent coefficient variable is a thickness of a material having a homogenous density.

6. The method according to claim 1, wherein the material-equivalent coefficient variable is a density of a material having a homogenous thickness.

7. The method according to claim 1, wherein the image value is a gray value of the projection image.

8. The method according to claim 1, wherein the image value is a color value of the projection image.

9. The method according to claim 1, wherein the functional relationship between the x-ray attenuation values and the material-equivalent coefficient variable is determined based on an empirical measurement.

10. The method according to claim 9, wherein an approximation formula for the functional relationship is determined from the empirically measured functional relationship.

11. The method according to claim 9, wherein the empirically measured functional relationship is stored in a lookup table.

12. The method according to claim 1, wherein the material-equivalent coefficient variable is calculated including a scattered radiation correction.

13. An x-ray examination device for generating two-dimensional projection images of a radiographed object, comprising:
   a radiation source having a focus for radiographing an object;
   a detector field arranged opposite the focus and after the object relative to an x-radiation direction and having a plurality of detector elements for detecting x-rays penetrating the object;
   a display unit; and
   a processing unit for determining x-ray attenuation values $J^-/J_0$ from local x-ray intensity values $J^-$ captured by the detector field and from initial x-ray intensity values $J_0$, the initial x-ray intensity values related to the x-rays before penetrating the object and for generating a projection image of the object based upon the determined x-ray attenuation values, wherein the processing unit comprises a calculation unit for determining a functional relationship $b_U = f_U^{-1}(J^-/J_0)$ between the x-ray attenuation values and a material-equivalent coefficient variable $b_U$ relative to an energy spectrum of the x-rays,
   the material-equivalent coefficient variable is assigned a value characteristic for one specific material, and
   the projection image is displayed on the display unit including the value characteristic for the one specific material,
   wherein the functional relationship is determined according to the formula $$f_U(b) = \int_0^{eU} \exp(-b\alpha_W(E)) S_U \, dE$$

wherein:
   $S_U$ = an energy-dependent standardized attenuation value,
   b = a path length of the x-radiation,
   $\alpha_W(E)$ = an energy-dependent mass attenuation coefficient.

14. The x-ray examination device according to claim 13, wherein the calculation unit includes a computer program, a circuit or an ASIC.

* * * * *